US012315532B2

(12) United States Patent
Jeong et al.

(10) Patent No.: US 12,315,532 B2
(45) Date of Patent: May 27, 2025

(54) AUDIO DATA IDENTIFICATION APPARATUS

(71) Applicant: Cochl Inc, Dover, DE (US)

(72) Inventors: Ilyoung Jeong, Seoul (KR); Hyungui Lim, Seoul (KR); Yoonchang Han, Seoul (KR); Subin Lee, Seoul (KR); Jeongsoo Park, Suwon-si (KR); Donmoon Lee, Seoul (KR)

(73) Assignee: Cochl Inc, Dover, DE (US)

( * ) Notice: Subject to any disclaimer, the term of this patent is extended or adjusted under 35 U.S.C. 154(b) by 310 days.

(21) Appl. No.: 17/911,078

(22) PCT Filed: Feb. 26, 2021

(86) PCT No.: PCT/KR2021/002496
§ 371 (c)(1),
(2) Date: Sep. 12, 2022

(87) PCT Pub. No.: WO2021/182782
PCT Pub. Date: Sep. 16, 2021

(65) Prior Publication Data
US 2023/0178096 A1     Jun. 8, 2023

(30) Foreign Application Priority Data
Mar. 13, 2020  (KR) .......... 10-2020-0031064

(51) Int. Cl.
*G10L 17/18*     (2013.01)
*G10L 15/06*     (2013.01)
(Continued)

(52) U.S. Cl.
CPC .............. *G10L 25/51* (2013.01); *G10L 15/06* (2013.01); *G10L 25/30* (2013.01)

(58) Field of Classification Search
CPC ......... G10L 25/51; G10L 15/06; G10L 25/30; G10L 13/033; G06F 16/68
(Continued)

(56) References Cited

U.S. PATENT DOCUMENTS 11,069,334 B2 * 7/2021 Laput ................ G10L 13/033
2009/0228422 A1   9/2009 Yen et al.
(Continued)

FOREIGN PATENT DOCUMENTS

JP   2019036201 A    3/2019
KR   1020180122171 A   11/2018
(Continued)

*Primary Examiner* — Md S Elahee
(74) *Attorney, Agent, or Firm* — NKL Law; Jae Youn Kim (57) ABSTRACT

Proposed is an audio data identification apparatus for collecting random audio data and identifying an audio resource obtained by exacting any one section of the collected audio data. The audio data identification apparatus includes: a communication unit that collects and transmits the random audio data; and a control unit that identifies the collected audio data. The control unit includes: a parsing unit that parses the collected audio data into predetermined units; an extraction unit that selects, as the audio resource, any one of a plurality of parsed sections of the audio data; a matching unit that matches identification information of the audio resource via a pre-loaded artificial intelligence algorithm; and a verification unit that verifies the identification information matched to the audio resource.

4 Claims, 7 Drawing Sheets

(51) Int. Cl.
*G10L 25/30* (2013.01)
*G10L 25/51* (2013.01)

(58) Field of Classification Search
USPC .......................................................... 704/232
See application file for complete search history.

(56) References Cited

U.S. PATENT DOCUMENTS

2020/0020328 A1   1/2020   Gordon et al.
2020/0051544 A1   2/2020   Laput et al.

FOREIGN PATENT DOCUMENTS

| KR | 20190048248 A | 5/2019 |
| KR | 20190094316 A | 8/2019 |
| KR | 20190106902 A | 9/2019 |
| KR | 20190109868 A | 9/2019 |
| KR | 20200016111 A | 2/2020 |

* cited by examiner

AUDIO DATA IDENTIFICATION APPARATUS

TECHNICAL FIELD

The present disclosure relates to an audio data identification apparatus for randomly collecting audio data and identifying an audio resource obtained by extracting a section of the collected audio data.

BACKGROUND ART

Recently, artificial intelligence (AI) technologies such as deep learning have been applied to process audio. An audio identification technique, which is one processing technique related to audio data, is developed to detect a subject that generates an audio input and a situation in which the audio input is generated by the subject.

Therefore, a plurality of audio inputs and identified audio information corresponding to the plurality of audio inputs or an audio analysis of the plurality of audio inputs are essential elements for implementing the audio identification technique using AI.

Conventionally, a method of collecting answers is used to obtain audio information corresponding to an audio input. Collecting audio information by the method of collecting answers is performed by a small number of employees, and thus characteristics of collected audio information may vary according to personal characteristics of the employees and the collected audio information may be limited.

That is, when audio information is collected by the method of collecting answers, it is difficult to secure the reliability and objectivity of the collected audio information and to obtain a wide range of audio information. In addition, when the reliability and range of audio information decrease, the performance of the audio identification technique decreases.

Furthermore, the method of collecting answers is performed passively by some employees and thus it takes a considerable time to collect audio information corresponding to a large amount of audio inputs.

As another method of the related art, there is a method of obtaining voice utterance data to build a voice recognition system. That is, there is a method in which employees produce utterances in an utterance situation and record and collect the utterances. However, according to this method, it is difficult to overcome regional limits because characteristics of audio information collected by a small number of employees may fundamentally vary.

Therefore, the present disclosure provides an audio data identification apparatus for training an AI algorithm by randomly collecting audio and video data from social networks and YouTube online and analyzing the audio and video data to identify an audio resource and verifying the identified information, thereby improving reliability and the performance of identifying a wide range of data.

DETAILED DESCRIPTION OF INVENTION

Disclosure

The present disclosure is directed to providing an audio data identification apparatus for randomly collecting audio data through a network.

The present disclosure is also directed to providing an audio data identification apparatus for matching identification information to an audio resource extracted by parsing randomly collected data in a certain unit.

The present disclosure is also directed to providing an audio data identification apparatus for matching identification information to an audio resource using an artificial intelligence (AI) algorithm and training the AI algorithm through verification to improve the performance of identification.

The present disclosure is also directed to providing an audio data identification apparatus for training an AI algorithm with an audio resource, for which identification information is not classified, through feedback.

The present disclosure is also directed to providing an audio data identification apparatus for allowing unspecified people to verify matched identification information through an external terminal, thereby improving reliability.

Technical Solution

According to an aspect of the present disclosure, an audio data identification apparatus includes a communicator configured to randomly collect audio data and transmit the audio data, and a controller configured to identify the collected audio data, wherein the controller includes a parser configured to parse the collected audio data in a predetermined unit, an extractor configured to select a section from among a plurality of parsed sections of the audio data, a matching unit configured to match identification information to the audio resource using an artificial intelligence (AI) algorithm installed in the matching unit, and a verification unit configured to verify the identification information matched to the audio resource.

In an embodiment, the AI algorithm may receive and learn a result of verifying the identification information by the verification unit, and the verification unit may identify the identification information on the basis of an input of a user through an external terminal.

In an embodiment, the verification unit may identify the identification information on the basis of inputs of unspecified people through an external terminal, and discard the audio resource when an error range of a result of identifying the identification information on the basis of the inputs of the unspecified people is large.

In an embodiment, the external terminal may receive information about whether the matched identification information is true or false and transmit the information to the verification unit.

In another embodiment, the external terminal may select and receive one of a plurality of identifiers provided in advance, determine whether the selected identifier is the same as the identification information matched to the audio resource, and transmit a result of the determination to the verification unit.

In an embodiment, the matching unit may match the identification information within a predetermined category, process the audio resource as unclassified data when the audio resource is not identified within the predetermined category, receive identification information corresponding to the audio resource, which is processed as the unclassified data, in the form of a subjective answer through the external terminal, and transmit the received identification information to the verification unit.

In an embodiment, the randomly collected audio data may be collected using a predetermined keyword.

Advantageous Effects

According to the present disclosure, the performance of identifying a wide range of audio resources can be improved.

In addition, the waste of manpower can be prevented and the accuracy of audio resources can be improved.

Therefore, according to an audio data identification apparatus of the present disclosure, identification information can be easily matched to audio data having a more complicated structure than text through an artificial intelligence (AI) algorithm, and the AI algorithm can be trained through a verification process, thereby building a database for identification of audio resources.

BEST MODE

Provided is an audio data identification apparatus including a communicator configured to randomly collect audio data and transmit the audio data, and a controller configured to identify the collected audio data, wherein the controller includes a parser configured to parse the collected audio data in a predetermined unit, an extractor configured to select a section from among a plurality of parsed sections of the audio data, a matching unit configured to match identification information to the audio resource using an artificial intelligence (AI) algorithm installed in the matching unit, and a verification unit configured to verify the identification information matched to the audio resource.

Modes of the Invention

Hereinafter, embodiments of the present disclosure will be described in detail with reference to the accompanying drawings so that they may be easily implemented by those of ordinary skill in the art. However, the disclosure may be embodied in many different forms and is not limited to the embodiments and drawings set forth herein. To clearly describe the present disclosure, in the drawings, parts that are not related to the present disclosure are omitted and the same or similar reference numerals denote the same or similar components.

Objects and effects of the present disclosure will be naturally understood or apparent from the following descriptions and are not described in detail when it is determined that they would obscure the present disclosure due to unnecessary detail. Thus, the objects and effects of the present disclosure are not limited thereto.

Figure 1:
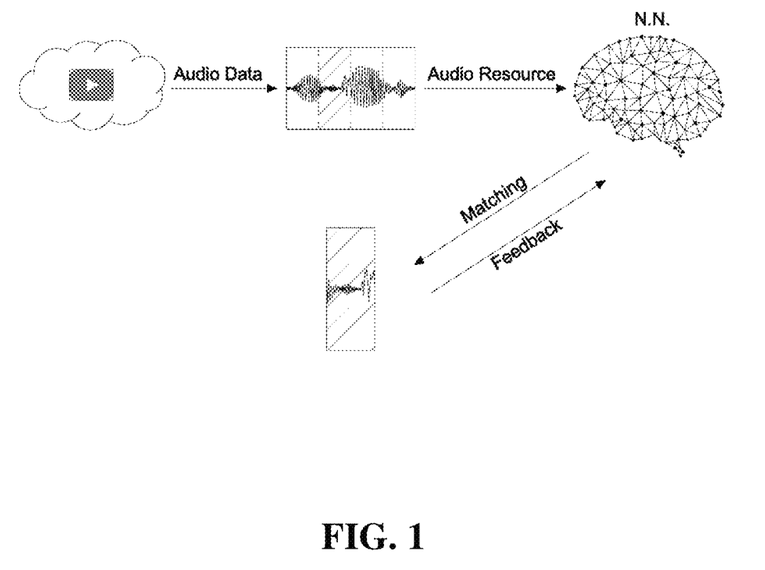
FIG. 1 is a schematic view of an audio data identification apparatus according to an embodiment of the present disclosure.

Hereinafter, embodiments of the present disclosure will be described in detail with reference to the accompanying drawings. FIG. 1 is a schematic view of an audio data identification apparatus according to an embodiment of the present disclosure.

First, an embodiment of the present disclosure will be briefly described with reference to FIG. 1. Audio data is collected by retrieving and downloading audio data from YouTube, social networks, etc. online according to a predetermined keyword, and a valid audio resource is extracted on the basis of the collected audio data. Thereafter, the context and type of the extracted audio resource are identified through an artificial intelligence (AI) algorithm to match identification information to the extracted audio resource, and a result of the matching is verified through feedback to train the AI algorithm, thereby improving the reliability and a range of identification of an audio data identification apparatus. That is, the audio data identification apparatus may allow the AI algorithm to learn by itself, thereby improving a capability of identifying target audio from among randomly collected audio data. The audio data identification apparatus may be provided as a separate apparatus or may be installed in various existing terminals. In detail, the audio data identification apparatus may be installed in a desktop computer, a laptop computer or the like to repeatedly perform a process of retrieving and learning information through the Internet. Alternatively, the audio data identification apparatus may be installed in a personal smart terminal such as a smart phone or a tablet PC to collect and learn video or audio data that is being used by a user. More specifically, according to an embodiment, the audio data identification apparatus may be installed in a user's smart phone or provided in the form of an application, and may repeatedly collect audio data on the basis of video or audio data that a user is viewing in real time, parse the audio data in a certain unit, extract a section from among a plurality of parsed sections of the audio data as an audio resource, and match identification information and receive feedback through an AI algorithm. According to an embodiment, when audio data that is being used by a user is collected and analyzed in the user's smart phone, the AI algorithm may be trained on the basis of each user. That is, it is possible to provide a personalized audio data identification apparatus.

Meanwhile, when an audio data identification apparatus is provided separately, the audio data identification apparatus may retrieve a keyword through the Internet to collect audio data to be analyzed. An audio resource may be extracted by dividing a section of the collected audio data, and identification information may be matched to the audio resource through an AI algorithm installed in the audio data identification apparatus. The matched identification information may be fed back through unspecified people, and in this case, the unspecified people may be users of smart terminals who receive an event in return for a certain reward through an application provided through a mobile phone, a tablet PC, a desktop computer, a laptop computer or the like or through the Internet. According to an embodiment, a verification event may be transmitted to smart phones of unspecified people through an application in return for certain points. Therefore, the unspecified people may listen to a corresponding audio resource, verify identification information matched through the AI algorithm, and input a result of the verification, so that the AI algorithm may be trained by receiving feedback.

Embodiments of an audio data identification apparatus of the present disclosure have been briefly described above, a configuration of the audio data identification apparatus will be described in detail with reference to FIG. 2 below, and these embodiments will be described in more detail with reference to FIGS. 3 to 7 below.

Figure 2:
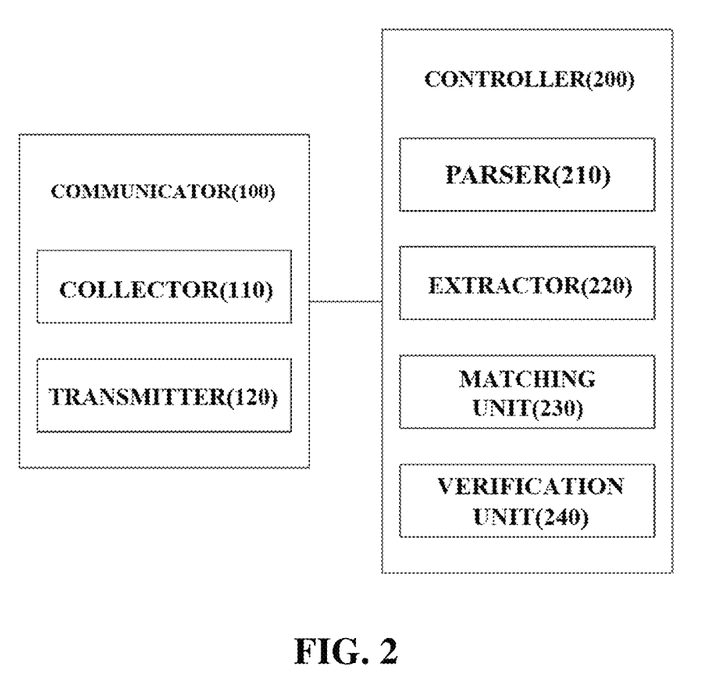
FIG. 2 is a block diagram of an audio data identification apparatus according to an embodiment of the present disclosure.

FIG. 2 is a block diagram of an audio data identification apparatus according to an embodiment of the present disclosure. Referring to FIG. 2, the audio data identification apparatus of the present disclosure may include a communicator 100 and a controller 200. The audio data identification apparatus may further include an input terminal to which data from a verification unit 240 to be described below is input.

First, the communicator 100 is configured to randomly collect audio data and transmit the audio data to the controller 200 and may include a collector 110 and a transmitter 120. Specifically, the communicator 100 may be a terminal provided in the audio data identification apparatus of the present disclosure or may be in a separate terminal form. That is, the communicator 100 may be a terminal such as a desktop computer or a digital TV or a mobile terminal such as a mobile phone, a laptop computer, a PDA, a tablet PC, or a wearable device.

The collector 110 is configured to randomly collect audio data, and may randomly collect audio data from audio data collected through retrieval by the communicator 100 described above. In detail, audio data may be collected by retrieving a predetermined keyword, and may be collected by retrieving the predetermined keyword through networks, such as social networks, YouTube, and blogs, through which audio data can be collected. Specifically, audio data may be collected according to an input of a user but it may be desirable to collect audio data randomly through a separate AI neural network without the user's intervention to improve the performance of the audio data identification apparatus of the present disclosure.

The transmitter 120 is configured to transmit audio data collected by the collector 110 to the controller 200. Specifically, the transmitter 120 may transmit the audio data via wire, but when the communicator 100 is configured as a separate terminal as described above, it is desirable that the transmitter 120 transmit audio data through wireless communication. More specifically, the transmitter 120 may include at least one among a broadcasting module, a mobile communication module, a wireless Internet module, and a short-range communication module to transmit collected audio data to the controller 200.

The controller 200 is configured to receive collected audio data from the communicator 100 and analyze and identify the audio data, and may include a parser 210, an extractor 220, a matching unit 230, and a verification unit 240.

The components of the controller 200 will be described in detail with reference to FIGS. 3 to 7 below. First, FIG. 3 is a diagram for describing a parser and an extractor according to an embodiment of the present disclosure.

Figure 3:
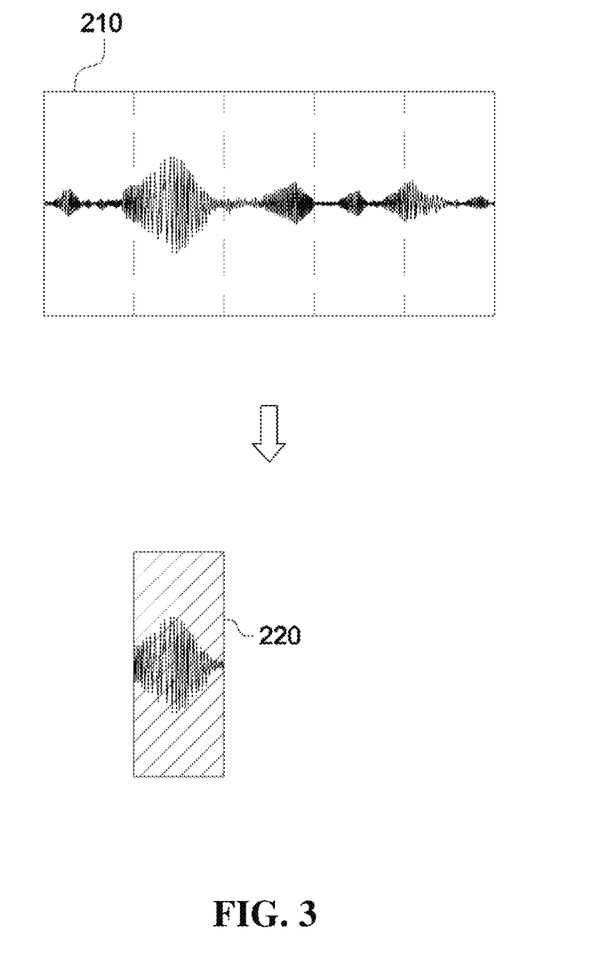
FIG. 3 is a diagram for describing a parser and an extractor according to an embodiment of the present disclosure.

Referring to FIG. 3, the parser 210 is configured to parse collected audio data in a certain unit. Specifically, the collected audio data may be parsed by dividing it into a plurality of sections, and in this case, the plurality of sections are preferably parsed in the same unit. Because the collected audio data is generally data including a mixture of sounds containing various types of identification information, it is preferable to parse the collected audio data, extract an audio resource for each parsed section of the audio data, and match identification information to the audio resource to improve a degree of identification. Specifically, according to an embodiment, a unit in which audio data is parsed by the parser 210 is preferably 0.5 to 2 seconds, and most preferably about 1 second. A waveform and wavelength of an extracted audio resource may be difficult to understand when a unit in which audio data is parsed is extremely short in length, and identification information may be difficult to match in the case of audio data of which some sections are similar in waveform, wavelength, and frequency. When a unit in which audio data is parsed is extremely long, it may be difficult to divide the audio data into several sections due to noise or various types of identification information contained in the audio data. Therefore, it is preferable to divide the audio data into several sections while parsing the audio data in an appropriate unit.

The extractor 220 is configured to select, as an audio resource, one of a plurality of sections of audio data parsed by the parser 210. Here, the audio resource is a section of the audio data to which identification information is to be matched by the matching unit 230 described below, and is preferably an audio resource having a certain unit length corresponding to one of a plurality of sections of the audio data parsed in the unit described above. In detail, only one audio resource may be extracted for each piece of audio data or an audio resource may be extracted for each of several sections of a piece of audio data and thus the reliability of an audio data identification apparatus of the present disclosure may be improved through matching and verification of identification information for each section of the same audio data.

Figure 4:
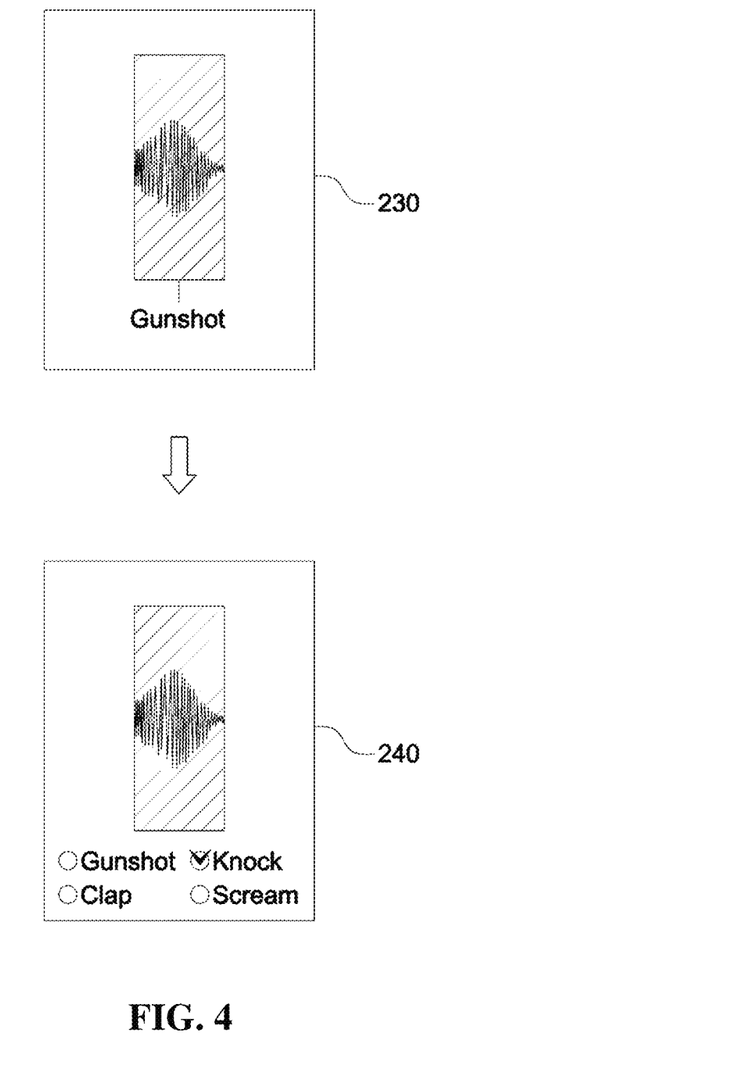
FIGS. 4 and 5 are diagrams for describing a feedback process performed by a snatching unit and a verification unit according to an embodiment of the present disclosure.
Figure 5:
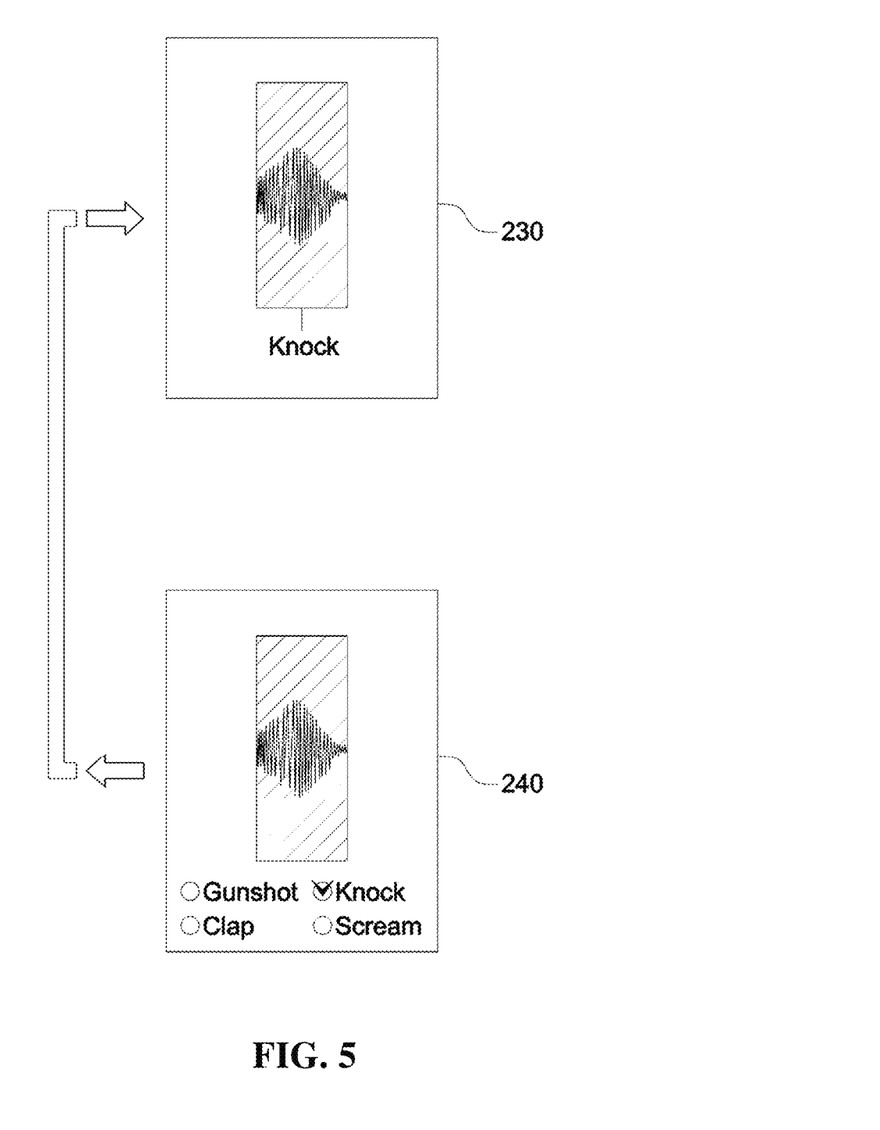
Figure 6:
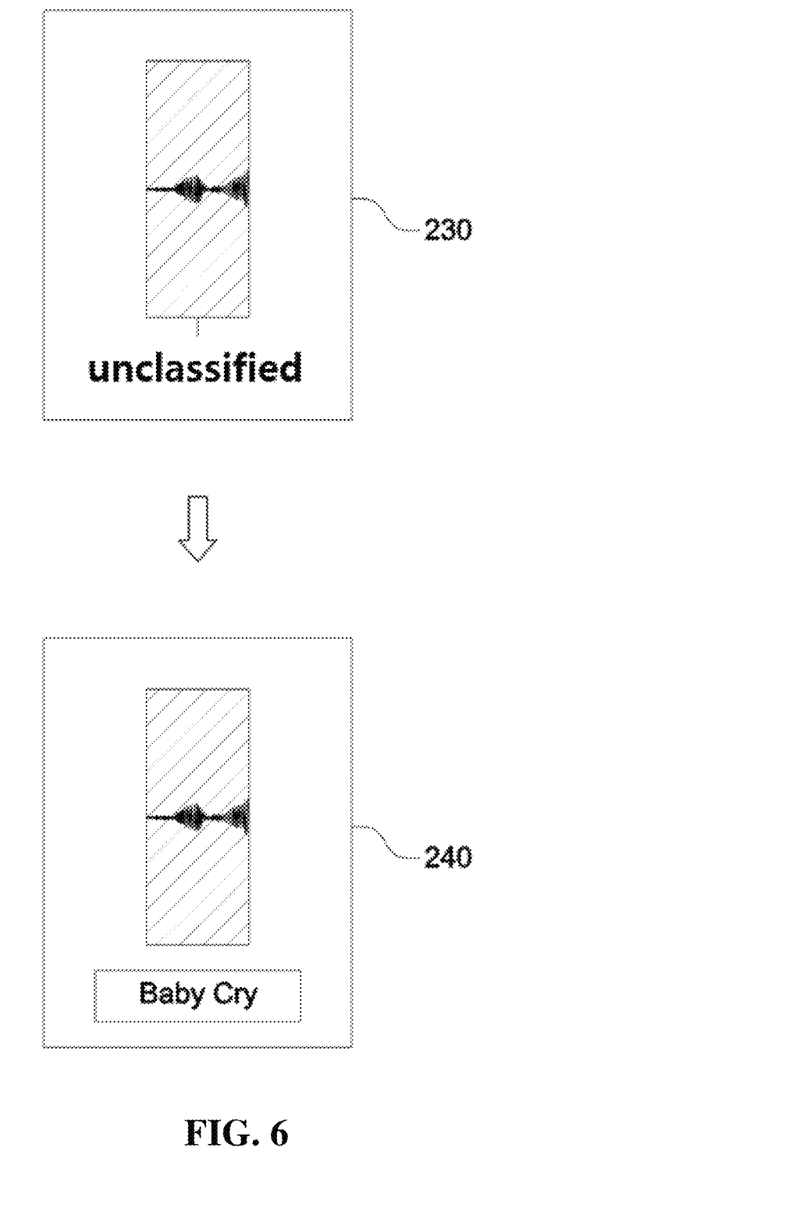
FIGS. 6 and 7 are diagrams for describing a feedback process performed by a matching unit and a verification unit according to another embodiment of the present disclosure.
Figure 7:
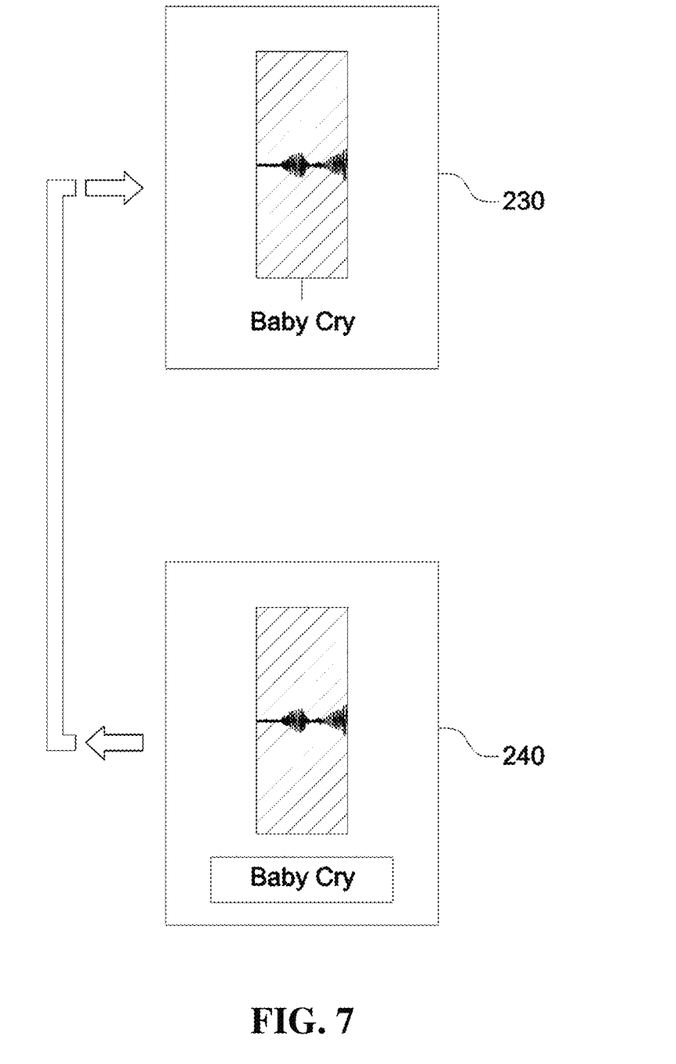

The matching unit 230 and the verification unit 240 of the present disclosure will be described in detail with reference to FIGS. 4 to 7 below. FIGS. 4 and 5 are diagrams for describing a feedback process performed by a matching unit and a verification unit according to an embodiment of the present disclosure. FIGS. 6 and 7 are diagrams for describing a feedback process performed by a matching unit and a verification unit according to another embodiment of the present disclosure.

The matching unit 230 is configured to match identification information to an audio resource, which is extracted by the extractor 220, through an AI algorithm installed therein in advance. Specifically, identification information may be matched through the AI algorithm included in the matching unit 230 as shown in FIG. 4. Specifically, in the matching unit 230, identification information of an audio resource is preferably matched through a pre-trained AI intelligence algorithm. Referring to FIG. 4, according to an embodiment, a pre-trained and installed AI algorithm may match identification information "Gunshot" to an extracted audio resource on the basis of a wavelength, waveform, frequency, etc. of the audio resource. In this way, identification information may represent a type or situation of sound of an audio resource. In detail, identification information is preferably matched to all audio resources transmitted from the matching unit 230, but it may be difficult to match identification information to audio resources of categories that are not learned by the AI algorithm. That is, the AI algorithm of the matching unit 230 may match identification information to an audio resource within a predetermined category, and the predetermined category is a category learned by the AI algorithm. Specifically, referring to FIG. 6, according to another embodiment, when an audio resource belongs to a field that is not learned by the AI algorithm and thus is not identified within the predetermined category, the audio resource may be processed as unclassified data by the matching unit 230.

In the matching unit 230, an audio resource matched to identification information by the AI algorithm pray be fed back through verification by the verification unit 240. In detail, as shown in FIGS. 5 and 7, the verification unit 240 may verify identification information matched to an audio resource and transmit a result of the verification to the matching unit 230. In detail, the verification unit 240 may input the result of the verification through a device included in the audio data identification apparatus, but it may be more preferable to input verification information through an external terminal. That is, the identification information may be identified on the basis of an input of a user through an external terminal. In detail, a user may listen to an audio resource to be verified and input a result of verifying the audio resource through his or her smart phone, tablet PC or the like. Alternatively, because the reliability of the result of the verification may be low when only the input of the user is taken into account, the identification information may be identified on the basis of inputs of unspecified people through an external terminal to further improve the reliability of the result of the verification. That is, an event may be transmitted to smart terminals of unspecified people to request unspecified people to listen to the audio resource and input a result of verifying the audio resource, and the result of the verification may be judged on the basis of inputs of the unspecified people. In this case, when an error range of the results of the verification that are input from the unspecified people with respect to the same audio resource is large, the audio resource is judged as an audio resource that is difficult to judge and thus is preferably discarded. In detail, when all results of verification obtained after ten unspecified people listen to the same audio resource are different from one another, the audio resource may be judged as inappropriate and thus may be discarded.

As described above, the verification unit 240 may receive a result of verification from a user or unspecified people and transmit the result to the matching unit 230, and in this case, the result of verification from the verification unit 240 may be input to the matching unit 230 through an external terminal. The external terminal may receive information about whether identification information matched to the audio resource by the matching unit 230 is true or false and transmit the information to the verification unit 240. In detail, a result of verification input as true may be transmitted to the matching unit 230 to increase a weight of a correct answer of the AI algorithm for the audio resource, and a result of verification input as false may be transmitted to the matching unit 230 to train the AI algorithm with feedback about a result of distinguishing between the audio resource and the identification information. Although whether the result of the verification unit is true or false may be simply fed back, as shown in FIG. 5, the verification unit 240 may select an identifier from among a plurality of identifiers provided in advance, receive the selected identifier, determine whether the selected identifier is the same as the identification information matched to the audio resource, and transmit a result of the determination to the verification unit 240.

Referring to FIGS. 4 and 5, in an embodiment, the verification unit 240 may select an identifier from among a plurality of identifiers provided in advance through an external terminal, receive the selected identifier, determine whether the selected identifier is the same as the identification information matched to the audio resource, and transmit a result of the determination. In detail, as shown in FIG. 4, when the matching unit 230 matches identification information "Gunshot" to the audio resource and the verification unit 240 listens to the audio resource and selects an identifier "Gunshot" from among a plurality of identifiers provided, the verification unit 240 may determine that the selected identifier and the identification information matched to the audio resource are the same and increase the reliability of the AI algorithm of the matching unit 230 in determination of the identification information "Gunshot." However, as shown in FIG. 4, when a user or unspecified people listen to the audio resource and select an identifier "knock," which is different from the matched identification information, from among a plurality of identifiers provided from the verification unit 240 through terminals, the verification unit 240 may transmit the selected identifier to the AI algorithm of the matching unit 230 to train the AI algorithm. Therefore, as shown in FIG. 5, the AI algorithm may learn the identifier selected by the verification unit 240 and the audio resource while matching the identifier and the audio resource, and the accuracy of matching identification information by the matching unit 230 may be improved by repeatedly performing the above process with respect to different audio resources.

Referring to FIGS. 6 and 7, in another embodiment, the matching unit 230 may match identification information to an audio resource in a predetermined category, and process the audio resource as unclassified data when the audio resource is not identified in the predetermined category. In detail, as described above, identification information may be matched in a category learned by an AI algorithm installed in advance in the matching unit 230, and an audio resource of a category that is not learned by the AI algorithm is preferably processed as unclassified data. Accordingly, as shown in FIG. 6, identification information corresponding to the audio resource processed as unclassified data may be input in the form of a subjective answer from a user or unclassified people through an external terminal, and transmitted to the verification unit 240. Thereafter, as shown in FIG. 7, the identification information transmitted to the verification unit 240 may be transmitted to the AI algorithm of the matching unit 230 to train the AI algorithm, and the number of categories for matching identification information by the matching unit 230 may be gradually increased by iteration of the process of training. However, when the identification information input in the form of a subjective answer front the user or the unclassified people is directly transmitted to the AI algorithm of the matching unit 230, wrong identification information may be transmitted due to subjective judgment of individuals who provide the identification information. Therefore, it is desirable to receive a plurality of pieces of identification information on the basis of inputs of a majority of people with respect to one audio resource and to discard the audio resource when it is determined that the plurality of pieces of identification information are not uniform and an error range is large. However, when inputs of a majority of people are the same but only an input of one person is different from the inputs, it is determined that the person has made a mistake and thus the AI algorithm is trained on the basis of the inputs of the majority of people. In this case, the more unspecified people who have a variety of experiences and backgrounds, the more reliable the audio resource.

In particular, in a method of identifying identification information of an audio resource by an AI algorithm according to an embodiment of the present disclosure, when identification information is identified by analyzing a waveform, a wavelength, a frequency, etc. of an audio resource, the amount of audio resources to be classified as unclassified data or discarded can be reduced by increasing ranges of a waveform, a wavelength, a frequency, etc., and an audio data identification apparatus with a wider range and higher reliability can be provided by receiving feedback about a result of identifying the identification information from the verification unit 240. According to an audio data identification apparatus of the present disclosure, simple feedback from tasks of individual workers can be provided to prevent waste of manpower, and unspecified people are requested to give feedback in return for a reward to reduce labor costs and provide an audio data identification apparatus with a variety of ranges.

With the audio data identification apparatus according to the present disclosure, user-customized audio identification and audio information can be provided, and audio data can be provided in response to a request from a user. In detail, an audio data identification apparatus using an AI algorithm trained on the basis of a user is capable of providing audio data that the user needs upon receiving identification information of the audio data from the user. The hearing-impaired are likely to be in dangerous situations and encounter problems and inconvenience because they are not able to hear sounds in real life. When the audio data identification apparatus of the present disclosure is provided as a user device or a device for the hearing-impaired, it is possible to achieve an effect of providing audio information in real time using senses such as the sense of vision and the sense of touch. Specifically, a hearing-impaired person walking along the street can be provided with a danger signal, such as horn blown behind them or various types of guidance, through vibration and visual information provided using a personal smart device. In addition, it is possible to relieve inconvenience in everyday life by providing information about sounds of everyday life, such as the sound of a baby who is crying and the sound of boiling water, using the sense of sight or the sense of touch. In this case, it may be more efficient when the personal smart device is a portable terminal or a wearable device such as a smart phone or smart watch.

The embodiments of the present disclosure set forth herein are only examples and thus various modifications may be made and other equivalent embodiments may be implemented by those of ordinary skill in the art from the embodiments set forth herein. Therefore, the scope of the present disclosure is not limited by the above-described embodiments and the accompanying drawings.

INDUSTRIAL APPLICABILITY

According to the present disclosure, the performance of identifying a wide range of audio resources can be improved.

In addition, the waste of manpower can be prevented and the accuracy of audio resources can be improved.

Therefore, according to an audio data identification apparatus of the present disclosure, identification information can be easily matched to audio data having a more complicated structure than text through an artificial intelligence (AI) algorithm, and the AI algorithm can be trained through a verification process, thereby building a database for identification of audio resources.

The invention claimed is:

1. An audio data identification apparatus comprising:
a collector configured to collect audio data by randomly searching a predetermined keyword on a predetermined network;
a communicator configured to transmit the collected audio data; and
a controller configured to identify the collected audio data,
wherein the controller comprises:
a parser configured to parse the collected audio data in a predetermined unit;
an extractor configured to select an audio resource from a plurality of parsed sections of the audio data;
a matching unit configured to match identification information to the audio resource using an artificial intelligence (AI) algorithm installed in the matching unit; and
a verification unit configured to verify the identification information matched to the audio resource,
wherein the AI algorithm receives and learns a result of verifying the identification information by the verification unit, and
wherein the verification unit identifies the identification information based on an input of unspecified people through an external terminal, and discards the audio resource when all verification results of the unspecified people are different from one another, and transmit an event to provide a reward in a process of receiving the input of the unspecified people for identifying the identification information.

2. The audio data identification apparatus of claim 1, wherein the external terminal receives information about whether the matched identification information is true or false and transmits the information to the verification unit.

3. The audio data identification apparatus of claim 1, wherein the external terminal selects and receives one of a plurality of identifiers provided in advance, determines whether the selected one of the plurality of identifiers is the same as the identification information matched to the audio resource, and transmits a result of the determination to the verification unit.

4. The audio data identification apparatus of claim 1, wherein the matching unit matches the identification information within a predetermined category, processes the audio resource as unclassified data when the audio resource is not identified within the predetermined category, receives identification information corresponding to the audio resource, which is processed as the unclassified data, in the form of a subjective answer through the external terminal, and transmits the received identification information to the verification unit.

* * * * *